United States Patent [19]
Carpenter

[11] Patent Number: 5,852,062
[45] Date of Patent: *Dec. 22, 1998

[54] APPARATUS AND METHODS FOR PROCESSING SCRAP TIRES

[76] Inventor: Roland K. Carpenter, 251 W. Canal Dr., Palm Harbor, Fla. 34684

[*] Notice: The term of this patent shall not extend beyond the expiration date of Pat. No. 5,236,352.

[21] Appl. No.: 244,919

[22] PCT Filed: Aug. 16, 1993

[86] PCT No.: PCT/US93/07709

§ 371 Date: Jun. 8, 1994

§ 102(e) Date: Jun. 8, 1994

[87] PCT Pub. No.: WO94/08768

PCT Pub. Date: Apr. 28, 1994

Related U.S. Application Data

[63] Continuation-in-part of Ser. No. 958,967, Oct. 8, 1992, Pat. No. 5,236,352.

[51] Int. Cl.⁶ .............................. C08J 11/04; F27B 14/00; B09B 3/00
[52] U.S. Cl. .............................. 521/41; 521/40; 521/40.5; 422/122; 422/184; 432/134; 432/210
[58] Field of Search ............................... 521/40, 40.5, 41; 422/128, 184; 432/134, 210

[56] References Cited

U.S. PATENT DOCUMENTS

| | | | |
|---|---|---|---|
| 3,172,648 | 3/1965 | Brichard | 432/161 X |
| 3,725,314 | 4/1973 | Pelofsky . | |
| 3,822,218 | 7/1974 | Whittaker et al. | 252/421 |
| 3,873,479 | 3/1975 | Ficker | 260/710 |
| 3,896,059 | 7/1975 | Wakefield et al. . | |
| 4,161,391 | 7/1979 | Parker | 432/210 X |
| 4,255,129 | 3/1981 | Reed et al. | 432/153 |
| 4,614,752 | 9/1986 | Fuchs et al. . | |
| 4,686,207 | 8/1987 | Lyakhevich et al. | 585/241 |
| 4,687,438 | 8/1987 | Schmidt et al. | 432/161 X |
| 4,759,710 | 7/1988 | Polaczy et al. | 432/210 X |
| 4,872,954 | 10/1989 | Hogan | 202/105 |
| 5,061,363 | 10/1991 | Farcasiu et al. | 208/419 |
| 5,269,947 | 12/1993 | Baskis | 585/240 |
| 5,284,625 | 2/1994 | Isayev et al. | 521/40 |

FOREIGN PATENT DOCUMENTS

| | | |
|---|---|---|
| 3313470 | 10/1984 | Germany . |
| 3420609 | 12/1985 | Germany . |
| 4124697 | 1/1993 | Germany . |
| 2121741 | 6/1987 | Japan . |

OTHER PUBLICATIONS

International Symposium on Scrap Tire Disposal, Oct. 21–22, 1982, Thermal Depolymerisation of Waste Tires by Heavy Oils. Conversion Into Fuels, by F. Audibert and J.P. Beaufils.

Another use for old Tires, Coprocess them with coal to make liquid fuels. by Malvina Farcasiu, Chemtech Jan. 1993, pp. 22–24, published 1993 American Chemical Society.

*Primary Examiner*—Vasu Jagannathan
*Assistant Examiner*—Olga Asinovsky
*Attorney, Agent, or Firm*—Alan D. Kamrath; Peterson, Wicks, Nemer & Kamrath, P.A.

[57] ABSTRACT

An apparatus (10) for liquefying tires is shown in a first form including a plurality of tire modules (12) holding tires which are immersed in and preheated by a slurry located in a tank (22). After preheating, the tire module (12) and tires held thereon are removed from the preheat tank (22) and are immersed in a slurry located in a high temperature tank (28). The temperature of the slurry in the high temperature tank (28) is sufficient to liquify the tires. As the tires liquify, the slurry produced is retained in the high temperature tank (28) to immerse further tires and also overflows from the high temperature tank (28) to the preheat tank (22) and then to a storage tank (36). The slurry from the storage tank (36) can be pumped to the burner (42) of the heat exchanger (48) for heating the slurry in the high temperature tank (28) or can be used for other purposes. In an alternate form, the apparatus (10) includes a vertical stack of tires held in a basket (64) removably supported in a tank (62), with the height of the stack being greater than the outlet (74) of the tank (62) and the level of the slurry located in the tank (62). Thus, the tires above the slurry are preheated prior to being immersed in the slurry and act as a weight to move the stack of tires downward as the lower tires in the slurry are melted.

25 Claims, 2 Drawing Sheets

APPARATUS AND METHODS FOR PROCESSING SCRAP TIRES

CROSS REFERENCE

The present application is the national phase of international application No. PCT/US 93/07709 filed Aug. 16, 1993 which is a continuation-in-part of U.S. patent application Ser. No. 07/958,967 filed Oct. 8, 1992, now U.S. Pat. No. 5,236,352.

BACKGROUND

The present invention generally relates to apparatus and methods for processing scrap tires for reuse, and particularly to apparatus and methods for extracting liquid rubber/fiber/catalyst slurry from the remaining components of the tires, with the liquid slurry and remaining components being in a condition for reuse and/or recycling.

The United States alone scraps about 250,000,000 tires per year or roughly one tire per person per year, with 2–4 billion tires currently stockpiled. These stockpiled tires represent potential threats for both air and water quality plus they provide a breeding ground for mosquitoes. Each of the solutions to the present scrap tire problem has difficulties. One method of disposal is landfilling the tires; however, tires generally do not degrade and whole tires cannot be landfilled because they "bubble up" to the surface. Specific disposal of tires is expensive but does tend to preserve the resource for a later date.

Using scrap tires to develop energy serves two purposes: first, it disposes of the tire, and second, it provides industrial/commercial companies with lower fuel cost energy. The economic cost/benefit of the waste-to-energy (WTE) approach will depend greatly on the particular type of combustor being used. For example, many moving grate type boilers have great difficulty if there is too much steel remaining in the fuel. The cost of removing the steel belts and steel beads from a tire is expensive. Generally speaking, the light belt wire in a typical steel belted radial tire will be consumed in combustors that operate at 870° C. and above. The primary problem is the steel bead. The steel bead survives temperatures in the range of 870°–1370° C. and could present problems in mechanical mechanisms in today's combustors and also provide a problem in the need for removing the steel from the ash. Some boilers have other significant problems in burning tires in the inability to handle the sulfur content and the effect of zinc oxide coating of heat transfer elements.

Recycling of all the tire components is the optimum choice both from the environmental and an economic viewpoint. One of the problems of recycling of scrap tires is the great difficulty in separating the components. The tire companies have spent years making the steel, rubber and fiber virtually non-separable. Pyrolysis has been tried to break a tire into its components but has proven uneconomical because of the lack of a market for the oils and tire char that result. Cryogenics has been used to attempt to separate the components of the tire and in most cases has proven uneconomical. Rubber is a material that is a "thermoset" which means it can/be used once and cannot be reheated for a second or subsequent application. Most recycling technology has been targeted at taking the rubber and treating it in a manner to allow it to "crosslink" or bond with other virgin or recycled material. Laboratory and engineering experiments have shown that surface treating of crumb rubber particles (20 mesh or smaller) does produce a surface condition that does crosslink. Two of the surface treatment methods are special polymers and the use of reactive gas. Untreated rubber/fiber is being used in a number of applications where it is not surface treated. One application of rubber and fiber particles is the "Tire Turf" for running tracks and athletic fields. Untreated crumb rubber has been used in asphalt rubber for roads but in small quantities and has the disadvantage of being considerably more costly than standard asphalt. Some of the recycling research has included the blending of recycled treated rubber particles with thermoplastic materials and has proven successful. Market development has been hindered by the high cost of separation of the tire components and the fact that potential users get into the chicken and egg dilemma. Recycled rubber users need to see a capability to produce the high production levels needed before they enter into the cost of development, engineering changes, etc. On the other hand, the developers of the raw material from scrap tires need to have some assurance that, if they develop such a capability, a customer exists.

As set forth in the paper entitled "Thermal Depolymerisation of Waste Tires by Heavy Oils. Conversion Into Fuels" presented by F. Audibert and J. P. Beaufils at the International Symposium on Scrap Tire Disposal on Oct. 21 and 22, 1982, the French Institute of Petroleum has developed a process of valorisation of waste tires into fuels. The process consisted of sprinkling tires held in a basket with a contacting oil heated to a temperature of up to 380° C. However, this process was merely a pilot study, which is believed not to have resulted in any production or commercial processes as being generally not practical and too costly. Additionally, using crude oil as the contacting oil, many distillate products and volatile and/or aromatic ingredients were created, producing other concerns including environmental concerns.

Thus, a need continues to exist for the disposal of scrap tires which overcomes the problems encountered by prior disposal methods.

SUMMARY

An object of the present invention is to provide a non-mechanical thermal approach to processing scrap tires. It is an aim of the present invention that the processing apparatus is able to process all types of tires from automotive, truck, aircraft, off-the-road, and other varieties, and generally without requiring the tires to be physically separated by types, materials and the like.

A further object of-the present invention is to provide a non-mechanical approach which separates the components of the tires into forms which are compatible for reuse. It is-an aim of the present invention to liquify the rubber/fiber/catalyst which washes or separates from the steel belts and beads of the tire, with the liquid rubber/fiber/catalyst being removable as a slurry while the steel belts and beads can be physically removed from the slurry intact and generally free of foreign materials for recycling.

In yet another object of the present invention, the tires themselves provide the energy necessary to separate the components of the tires, with the excess material produced being available as a pumpable liquid slurry for immediate use as a fuel for other uses or for later use as a fuel or for recycling.

Surprisingly, the above objectives and other needs can be satisfied in the field of scrap tire disposal by providing, in the preferred form, apparatus and methods for immersing the scrap tires in a tank of slurry of liquified rubber and fiber heated to a temperature to liquify the rubber and fiber of the scrap tires.

In a preferred aspect of the present invention, the scrap tires are preheated prior to being immersed in the slurry in a first form by being immersed in a slurry contained in a second tank resulting from the overflow of the slurry from the first tank and in a second form by, being stacked to a height above the level of the slurry.

Also, in a further preferred aspect, the slurry created-by the liquification of the rubber and fiber from the scrap tires is utilized as fuel for the processing apparatus, with excess slurry being available for fuel or for other purposes including recycling.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
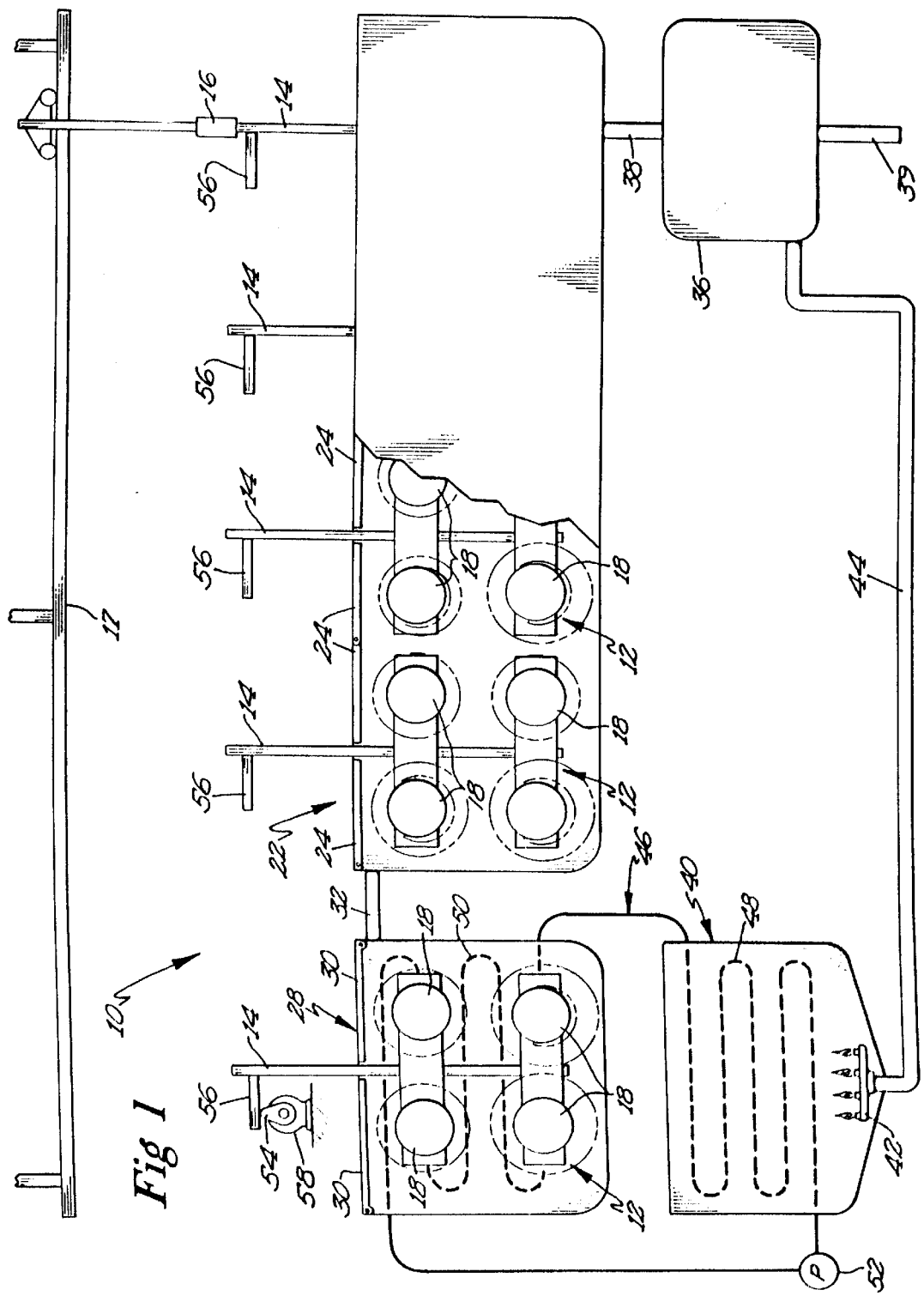
FIG. 1 shows a diagramatic view of an apparatus for processing scrap tires according to methods in accordance with the preferred teachings of the present invention.

All Figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "wend", and similar terms are used herein, it should be understood that these terms have reference only to the structure shown in the drawings as it would appear to a person viewing the drawings and are utilized only to facilitate describing the invention.

DESCRIPTION OF THE PREFERRED EMBODIMENTS

An apparatus or system according to the preferred teachings of the present invention for separating rubber, fiber, and catalyst from the steel belts and beads of a tire is shown in the drawings and generally designated 10. System 10 generally includes a module 12 for holding tires, with module 12 being of an inverted "T" arrangement. Specifically, module 12 includes a stem 14 which vertically protrudes from the top side of module 12 and is removably interconnectable with a powered receiver 16, with receiver 16 being movable on an overhead rail 17 to move module 12 in horizontal and vertical directions. A plurality of racks 18 are secured to stem 14, with each rack 18 holding a plurality of tires, with eight racks 18 each holding 10 automobile tires for a total of eighty tires-being provided in the most preferred form. For larger tires, module 12 can have only one rack 18 on each side of stem 14 allowing for larger tires in the same space. Racks 18 in the most preferred form are formed by cylindrical tubes of expanded metal of a diameter for slideable receipt in the rim openings of the tire. A latching device can be included on each rack 18 for keeping the tires from coming loose from racks 18 and also possibly for holding the steel belts of the tire after the rubber, fiber, and catalyst have been liquefied therefrom.

System 10 further includes a pre-heat tank 22 which is large enough to hold a plurality of tire handler modules 12, with five tire handler modules 12 being held in tank 22 in the preferred form. Tank 22 includes doors 24 or other provisions for allowing the removal and insertion of modules 12 with the tires held thereon. Tank 22 is suitably insulated to reduce heat transfer.

System 10 further includes a high temperature tank 28, with tank 28 being smaller than tank 22 to allow for heat efficiency and faster production rates, with tank 28 being of a size to handle one tire handler module 12 in the preferred form. Tank 28 includes doors 30 or other provisions for allowing the insertion of modules 12 with tires held thereon and for allowing the removal of modules 12 after the rubber/fiber/catalyst of the tires is liquified and separated from the steel belts and beads. Tank 28 is suitably insulated to reduce heat transfer. Tanks 22 and 28 include an overflow passage 32 therebetween, with tank 22 receiving overflow of high temperature liquid slurry from tank 28 as the tires are melted in tank 28.

System 10 further includes a storage tank 36 for temporary storage of liquefied rubber/fiber/catalyst slurry and to allow the slurry to cool if desired. An overflow passage 38 extends between tank 22 and tank 36, with tank 36 receiving overflow of liquid slurry from tank 22 as liquid slurry is transferred into tank 22 from tank 28. Storage tank 36 includes a suitable outlet 39 for removing the liquid slurry as desired.

System 10 further includes a reactor vessel 40 including a burner or like combustor 42 capable of burning crude oil (Bunker C) and preferably capable of burning liquefied rubber/fiber/catalyst slurry. A passage 44 extends from storage tank 36 to burner 42 and may include suitable pumping means if necessary. Reactor vessel 40 further includes a fluid circulation loop 46 including a first heat exchanger 48 exposed to the radiant heat of burner 42 for heating the fluid inside of heat exchanger 48 and loop 46. Loop 46 further includes a second heat exchanger 50 located in tank 28 for heating the slurry located inside thereof. Loop 46 includes a suitable pump 52 for circulating the fluid through loop 46.

Now that the basic construction of system 10 according to the preferred teachings of the present invention has been explained,, the operation and subtle features of system 10 can be set forth and appreciated. Initially, tanks 22 and/or 28 can be filled with used motor oil to start the heat transfer to tires located therein. Much of the aromatics have been removed from used motor oil so that volatile ingredients will be reduced when heated.

It can be appreciated that the motor oil will be displaced and replaced by slurry as the tires are liquified according to the teachings of the present invention. Specifically, in the preferred form, a single tire handler module 12 (preferably preheated to a temperature of 150°–230° C. in preheat tank 22 as will be explained hereinafter) is placed in high temperature tank 28 with all of the tires in tire handler module 12 immersed in the hot liquid slurry contained in tank 28. The liquid slurry contained in tank 28 is heated by heat exchanger so of loop 46 to a temperature in the order of 345°–400° C. At this temperature, the hot slurry will separate and "wash" the rubber, fiber, and catalyst from the steel belts and beads of the tires. The rubber/fiber/catalyst of the tires of tire handler module 12 immersed in the hot liquid slurry will be liquefied into a slurry and will separate from the steel belts and beads. As the rubber/fiber/catalyst of the tires is liquified, the liquid slurry in tank 28 overflows through passage 32 into tank 22. As previously set forth, tank 22 in the most preferred form holds 5 tire handler modules 12, with the hot liquid slurry overflowing from tank 28 preheating the ambient temperature tires before their placement in tank 28. As it is desired to reduce the heat of the hot liquid slurry to about 200° C for temporary storage, the use of the hot liquid slurry to preheat the tires conserves energy necessary for burner 42. The temperature of the liquid slurry in tank 22 will be less than the temperature of the liquid slurry in tank 28 and will be in the range of 150°–230° C. As the liquid slurry overflows from tank 28 to tank 22, the liquid slurry will then overflow from tank 22 to storage tank 36 where the hot liquid slurry cools to a temperature in the order of 200° C. It can then be appreciated that the liquid slurry can be pumped, as needed, through passage 44 to burner 42 for heating heat exchanger 48 of loop 46 which in turn heats the slurry in tank 28. The excess liquid rubber/fiber/catalyst produced by system 10 can be drawn through outlet 39 for other uses, for example to fire other burners, can be molded into solid blocks for stacking and storage for future use, with such blocks not holding water as tires can, or can be converted by an extruder or similar machine into pellets or particles for easy transportation to the intended application, such as but not limited to for mixing with asphalt, and for highway construction including lane dividers, marker barrels, and the like.

After tire handler module 12 has been in tank 28 a sufficient time to liquify the rubber/fiber/catalyst from the tires held therein, tire handler module 12 and the steel belts and other residue can be removed from tank 28. The steel belts are washed clean and free of rubber and other material by the liquid slurry and remain intact for ease of removal and recycling of the steel therein. Another feature which can be provided to module 12 is the capability to vibrate the scrap tires in the slurry of tank 28 by vertically moving module 12 when the tires are totally immersed in tank 28 to allow the separation of the steel hoops from the rubber material. This vertical motion can be created by a cam gear 54 which abuts with a stop 56 attached to module 12 and rotated by a motor 58. The vertical motion will be relatively small and specifically in the order of less than 4 inches (10 cm) and at a frequency in the order of 6 per minute. This motion can be easily adjusted depending upon the tire being processed.

After removal from tank 28, tire handler module 12 is then allowed to coolwand can be reloaded with tires for placement in preheat tank 22. It is desired that the tires loaded in tire handle module 12 be as reasonably clean as possible so that the slurry does not become too contaminated with debris which may affect its ability for use as a fuel or the like or for recycling.

After removal of tire handler module 12 from tank 28, one of the tire handler modules 12 located in preheat tank 22 is removed therefrom and placed in tank 28, with the tires preferably preheated in tank 22 to a temperature in the order of 150°–230° C. After immersion in the liquid slurry of tank 28, the liquefying operation is repeated. The remaining 4 tire handler modules 12 located in preheat tank 22 continue to be immersed in the liquid slurry of tank 22 for preheating until their turn at removal for placement in tank 28. Also, the tire handler module 12 removed from preheat tank 22 can be replaced with another tire handler module 12 holding tires of ambient temperature for preheating inside tank 22.

It should then be noted that system 10 according to the preferred teachings of the present invention does not encounter the problems encountered in prior WTE approaches. Specifically, the liquid slurry is free of steel belts and beads and thus existing combustors can be easily adapted and/or converted to utilize the liquid slurry. It can then be appreciated that because burner 42 utilizes the liquid slurry as fuel, system 10 according to the teachings of the present invention requires minimal outside energy requirements but utilizes the energy in the scrap tires to fuel system 10. Likewise, the liquid slurry which acts as the heat transferring agent to liquify the scrap tires is the same slurry produced by the liquification of the scrap tires such that an outside source of contacting oil is not required, with the problems arising from the use of contacting oil not being encountered.

In addition to avoiding the problems arising from the use of contacting oil, it should be appreciated that the present invention arrives at other advantages. Specifically, thermal transfer to the tire is optimized when the tire is totally immersed. Additionally, tanks 22 and 28 are generally filled with slurry, with the volume of air therein being minimized. Also, tanks 22 and 28 can be suitably insulated to reduce heat transfer. Also, as previously discussed, preheating of tires in tank 22 conserves energy necessary for burner 42. Thus, system 10 conserves energy in operation and is very energy efficient.

It should be noted that tanks 22, 28, and 36 and passages 32 and 38 therebetween are not pressurized and problems arising from pressure build-up by the heating of the slurry and/or the production of gases from the liquification of the scrap tires are avoided. Also, due to the lack of pressurization, placement of modules 12 in tanks 22 and 28 can be easily performed through doors 24 and 30.

System 10 can be portable by transportation on flatbed-like trailers to the scrap tire stockpile or can be installed at a fixed installation. Although traditional power supplies can be utilized in fixed installations, generators can be provided on portable systems to supply power for pumps 52, motors 58, controls, lighting, and the like if traditional power supplies are not available.

Figure 2:
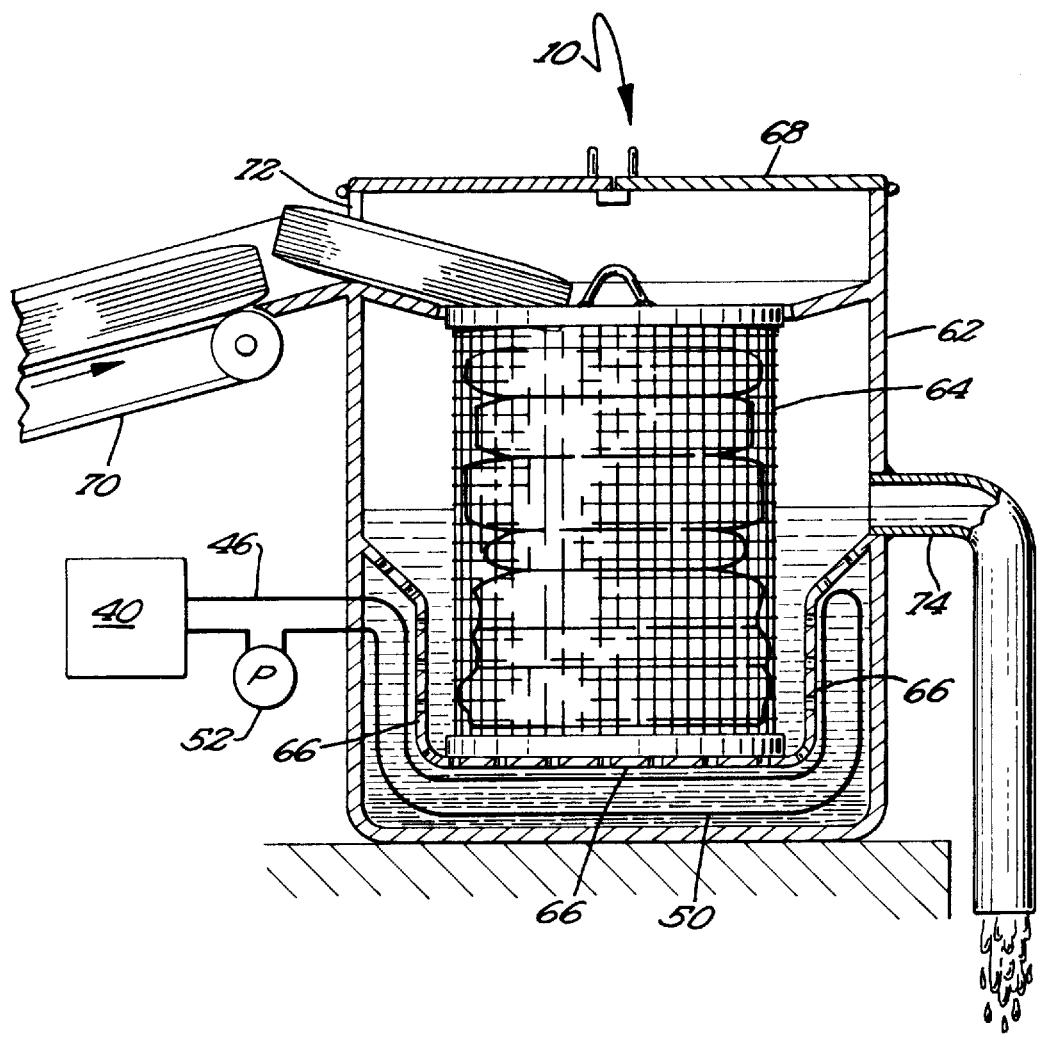
FIG. 2 shows a diagramatic view of an alternate form of an apparatus for processing scrap tires according to methods in accordance with the preferred teachings of the present invention.

It can be appreciated that system 10 according to the teachings of the present invention can be constructed to handle a range of capacities from a few hundred tires to many thousands or tens of thousands per day. System 10 as shown in FIG. 1 and described is of a preferred type for high capacity. An alternate form of system 10 is shown in FIG. 2 of the type especially adapted for lower capacities of numbers of tires processed, but which has the added capability to be easily transportable adjacent to and for placement close to smaller stockpiles of tires to be processed. Particularly, system 10 of FIG. 2 of the present invention generally includes a cylindrical tank 62 having a diameter just larger than the largest diameter of tires being processed. A basket 64 is removably supported in the interior of tank 62 such as by a perforated wall 66 located adjacent to but spaced from the bottom of tank 62. Tank 62 includes a removable top 68 or other provisions for allowing basket 64 to be inserted into or removed from the interior of tank 62. For introducing scrap tires into the interior of tank 62 and basket 64 for immersion in the slurry contained by tank 62, a conveyor 70 is provided for feeding the tires into tank 62 through an opening 72 located adjacent to top 68. An overflow type outlet 74 is provided in tank 62 spaced intermediate the bottom of tank 62 and top 68. Heat exchanger 50 is positioned below perforated wall 66 to prevent engagement of basket 64 therewith. Tank 62 can be suitably insulated to reduce heat transfer.

Now that the basic construction of system 10 of FIG. 2 according to the preferred teachings of the present invention has been explained, the operation and subtle features of system 10 can be set forth and appreciated. Initially, tank 62 can be filled with used motor oil to start the heat transfer to tires located therein up to the level of outlet 74. Tires can then be conveyed by conveyor 70 through opening 72 to fall into a vertical stack, with the tires being horizontally arranged in the stack. It can be appreciated that only the lower portion of the stack of tires will be immersed in fluid while the upper portion of the stack of tires is located above the fluid. The liquid slurry contained in tank 62 is heated by heat exchanger 50 of loop 46 to a temperature in the order of 345°–400° C. At this temperature, the hot slurry will separate and "wash" the rubber, fiber, and catalyst from the steel belts and beads of the tires. The rubber/fiber/catalyst of the tires immersed in the hot liquid slurry will be liquified into the slurry. As the rubber/fiber/catalyst of the tires is liquefied, the liquid slurry in tank 62 overflows through outlet 74. The liquid slurry from outlet 74 can be pumped, as needed, to burner 42 for heating heat exchanger 48 of loop 46 which in turn heats the slurry in tank 62 and the excess slurry produced by system 10 can be utilized for other purposes such as set forth previously. It can be appreciated that the tires above the slurry level will act as a weight to move the stack of tires downward as the lower tires are melted, with these upper tires being preheated prior to being immersed in the hot liquid slurry. Periodically, after all tires in tank 62 have been allowed to be melted, top 68 can be opened and basket 64 removed to allow removal of the steel or other material remaining from the tires after melting and retained in basket 64. A spare basket 64 can be provided to immediately replace the outgoing basket 64 to reduce downtime of system 10 which would be required to allow cool down of basket 64 after removal from tank 62 for allowing removal of the steel or other material.

It can be appreciated that a single reactor vessel 40 can supply high temperature fluid to several tanks 28 and/or 62 if multiple systems 10 are desired to be operated at a single location.

Although tires can be held whole in tire handler module 12 and basket 64 in the preferred form to avoid the energy intensive process of shredding, grinding, or slicing of the tires, tires can be put in system 10 in portions such as where tires may be desired to be sliced for large tires such as truck tires, where only portions of the tires are desired to be refined with the other portions being desired for other purposes such as recycling or reuse, and the like.

Also, system 10 according to the teachings of the present invention is adaptable to process non-tire scrap rubber and many types of plastics into a pumpable liquid slurry usable as a fuel or the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for processing at least portions of scrap tires which have not been shredded or ground comprising, in combination: a first tank for holding a slurry of liquified rubber and fiber; means for heating the slurry in the first tank to a temperature to liquify the rubber and fiber of scrap tires which have not been shredded or ground immersed in the first tank; a second tank for holding the slurry; an overflow passage from the first tank to the second tank; and means for immersing the scrap tires which have not been shredded or ground in the slurry of the second tank to preheat the scrap tires which have not been shredded or ground and then for immersing the scrap tires which have not been shredded or ground in the slurry of liquified rubber and fiber of the first tank to liquify the rubber and fiber of the scrap tires which have not been shredded or ground.

2. The apparatus of claim 1 wherein the second tank is of a size to receive multiple immersing means, with the scrap tires which have not been shredded or ground of each of the immersing means immersed in the slurry of the second tank.

3. The apparatus of claim 2 further comprising, in combination: a third tank for holding the slurry; and an overflow passage from the second tank to the third tank.

4. Apparatus for processing at least portions of scrap tires which have not been shredded or ground into other useful forms comprising, in combination: a first tank for holding a slurry of liquified rubber and fiber; means for immersing scrap tires which have not been shredded or ground in the slurry of liquified rubber and fiber of the first tank; means for heating the slurry in the first tank to a temperature to liquify the rubber and fiber from the scrap tires which have not been shredded or ground immersed in the first tank; wherein the immersing means comprises a tire handler module for holding the scrap tires which have not been shredded or ground; and means for vibrating the tire handler module in the first tank for vibrating the scrap tires which have not been shredded or ground in the slurry of liquified rubber and fiber of the first tank.

5. The apparatus of claim 4 wherein the tire handler module includes a stem vertically protruding therefrom, with the stem including a stop; and wherein the vibrating means comprises a rotatable cam for abutting with the stop of the stem.

6. Apparatus for processing whole scrap tires into other useful forms comprising, in combination: a first tank for holding a slurry of liquified rubber and fiber; means for heating the slurry in the first tank to a temperature to liquify the rubber and fiber of the scrap tires immersed in the first tank; and means for stacking the whole scrap tires in the slurry of the first tank to a height above the slurry of liquified rubber in the first tank, with the whole scrap tires above the slurry of liquified rubber in the first tank being preheated prior to being immersed in the slurry of the first tank.

7. The apparatus of claim 6 wherein the stacking means includes a basket removably supported in the tank for receipt of the tires.

8. The apparatus of claim 7 wherein the stacking means includes means for conveying the scrap tires into the first tank and the basket.

9. The apparatus of any one of claim 6 wherein the stacking means stacks the tires in a vertical stack, with the scrap tires being horizontally arranged in the vertical stack.

10. Apparatus for processing scrap tires into other useful forms comprising, in combination: a first tank for holding a slurry of liquified rubber and fiber; means for immersing scrap tires which have not been shredded or ground in the slurry of liquified rubber and fiber of the first tank; and means for heating the slurry in the first tank to a temperature to liquify the rubber and fiber of the scrap tires which have not been shredded or ground immersed in the first tank; wherein the heating means comprises, in combination: a burner capable of burning the slurry of liquified rubber; and means for passing the slurry of liquid rubber from the first tank to the burner.

11. Apparatus for processing at least portions of scrap tires which have not been shredded or ground into other useful forms comprising, in combination: a first tank for holding a slurry of liquified rubber and fiber; means for immersing scrap tires which have not been shredded or ground in the slurry of liquified rubber and fiber of the first tank; and means for heating the slurry in the first tank to a temperature to liquify the rubber and fiber of the scrap tires which have not been shredded or ground immersed in the first tank; wherein the heating means comprises, in combination: a fluid circulation loop including a first heat exchanger outside of the first tank and a second heat exchanger located in the slurry of the first tank; and a source of heat for exposure to the first heat exchanger.

12. Method for processing at least portions of scrap tires which have not been shredded or ground into other useful forms comprising the steps of: providing a first tank of a slurry of liquified rubber and fiber; heating the slurry of the first tank to a temperature to liquify the rubber and fiber of scrap tires which have not been shredded or ground; providing a second tank for holding-the slurry; overflowing the slurry from the first tank to the second tank; immersing the scrap tires which have not been shredded or ground in the slurry of the second tank; and immersing the scrap tires which have not been shredded or ground in the heated slurry of the first tank, with the scrap tires which have not been shredded or ground being immersed in the second tank prior to immersing the scrap tires which have not been shredded or ground in the slurry of the first tank to preheat the scrap tires which have not been shredded or ground.

13. Method for processing at least portions of scrap tires which have not been shredded or ground into other useful forms comprising the steps of: providing a first tank of a slurry of liquified rubber and fiber; heating the slurry of the first tank to a temperature to liquify the rubber and fiber of scrap tires which have not been shredded or ground; providing a tire handler module; placing the scrap tires which have not been shredded or ground on the tire handler module; immersing the tire handler module with the scrap tires which have not been shredded or ground placed thereon in the heated slurry of the first tank to liquify the rubber and fiber of the scrap tires which have not been shredded or ground; and vibrating the tire handler module for vibrating the scrap tires which have not been shredded or ground in the heated slurry of the first tank.

14. The method of claim 13 wherein the step of providing a tire handler module comprises the step of providing a tire handler module having a stem vertically protruding therefrom, with the stem including a stop; and wherein the vibrating step comprises the step of camming against the stop of the stem.

15. Method for processing whole scrap tires into other useful forms comprising the steps of: providing a first tank of a slurry of liquified rubber and fiber; heating the slurry of the first tank to a temperature to liquify the rubber and fiber of the scrap tires; and stacking the whole scrap tires in the first tank in a stack having a height above the slurry of liquified rubber in the first tank, with the whole scrap tires above the slurry of liquified rubber in the first tank being preheated prior to being immersed in the slurry of the first tank.

16. The method of claim 15 wherein the stacking step comprises the step of stacking the scrap tires in a vertical stack in the first tank, with the scrap tires being horizontally arranged in the vertical stack.

17. The method of claim 15 further comprising the step of providing a basket removably supported in the tank for receipt of the stack.

18. The method of claim 15 further comprising the step of conveying the scrap tires to the top of the stack.

19. The method of claim 15 wherein the heating step comprises the steps of: providing a burner; and combusting the liquified rubber and fiber from the first tank in the burner.

20. The method of claim 15 wherein the heating step comprises the steps of: providing a fluid circulation loop including a first heat exchanger outside of the first tank and a second heat exchanger located in the slurry of the first tank; and exposing the first heat exchanger to a source of heat.

21. The apparatus of claim 1 wherein the immersing means comprises means for immersing whole scrap tires.

22. The apparatus of claim 4 wherein the tire handler module holds whole scrap tires.

23. The apparatus of claim 11 wherein the immersing means comprises means for immersing whole scrap tires.

24. The method of claim 12 wherein the immersing step comprises the step of immersing whole scrap tires.

25. The method of claim 13 wherein the placing step comprises the step of placing whole scrap tires on the tire handler module.

\* \* \* \* \*

UNITED STATES PATENT AND TRADEMARK OFFICE
CERTIFICATE OF CORRECTION

PATENT NO. : 5,852,062

DATED : December 22, 1998

INVENTOR(S) : Roland K. Carpenter

It is certified that error appears in the above-identified patent and that said Letters Patent is hereby corrected as shown below:

Column 1, line 60, cancel "can/be" and substitute therefor --can be--.

Column 2, line 47, cancel "of-the" and substitute therefor --of the--.

Column 2, line 50, cancel "is-an" and substitute therefor --is an--.

Column 3, line 5, cancel "by," and substitute therefor --by--.

Column 3, line 7, cancel "created-by" and substitute therefor --created by--.

Column 3, line 42, cancel "wend" and substitute therefor --end--.

Column 3, line 63, cancel "tires-being" and substitute therefor --tires being--.

UNITED STATES PATENT AND TRADEMARK OFFICE
CERTIFICATE OF CORRECTION

PATENT NO. : 5,852,062

DATED : December 22, 1998

INVENTOR(S) : Roland K. Carpenter

It is certified that error appears in the above-identified patent and that said Letters Patent is hereby corrected as shown below:

Column 4, line 49, cancel "explained,," and substitute therefor --explained,--.

Column 4, line 64, cancel "so" and substitute therefor --50--.

Column 5, line 48, cancel "coolwand" and substitute therefor --cool and--.

Column 8, line 53, cancel "any one of".

Column 9, line 21, cancel "holding-the" and substitute therefor --holding the--.

Signed and Sealed this

Eighteenth Day of May, 1999

Attest:

Q. TODD DICKINSON

*Attesting Officer*   Acting Commissioner of Patents and Trademarks